United States Patent Office.

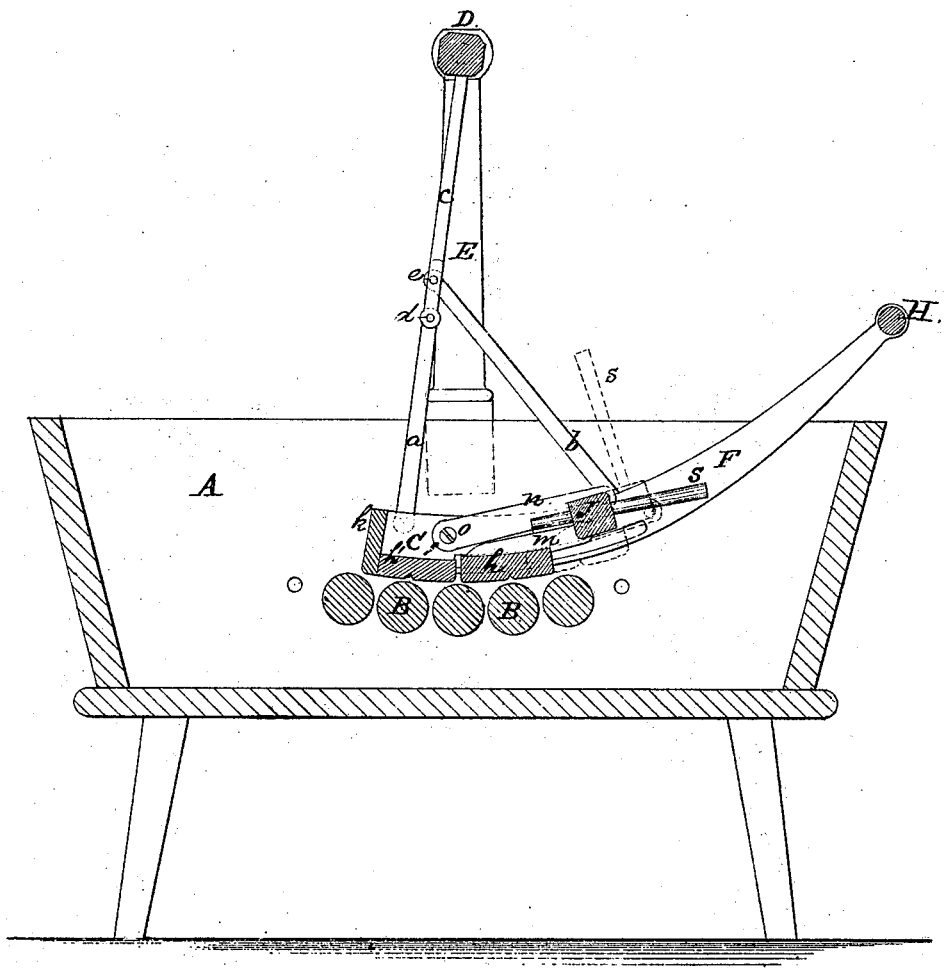

WILLIAM B. H. BEACH, OF NAPLES, NEW YORK.

Letters Patent No. 109,287, dated November 15, 1870.

IMPROVEMENT IN WASHING-MACHINES.

The Schedule referred to in these Letters Patent and making part of the same.

*To all whom it may concern:*

Be it known that I, WILLIAM B. H. BEACH, of Naples, in the county of Ontario and State of New York, have invented a new and improved Washing-Machine; and I do hereby declare that the following is a full, clear, and exact description of the construction and operation of the same, reference being had to the accompanying drawing making a part of this specification, in which the figure in the drawing represents a longitudinal section.

My invention consists—

First, of a rubber, suspended by hinge-jointed arms, attached to a shaft supported by standards attached to the sides of the machine, so as to permit the said rubber to adjust itself to all thicknesses of clothes to be washed.

Second, of the rubber divided in two parts and arranged to open and close by a lever for inserting and retaining the clothes, thus securing the advantages of the ordinary process of hand-rubbing, but in a less laborious manner, by selecting and securing in the rubber such parts as need most rubbing, and operating directly upon them without subjecting the other parts to unnecessary rubbing.

A is the box or machine, of a suitable size and shape.

B are rollers, arranged to revolve, or, if preferable, a wash-board permanently fastened may be used.

C is the rubber, which is suspended from the shaft D above by an arrangement of arms, a b c, a b being pivoted to each side of an arm, to which the rubber is attached, and thence to arm c at d e, arm c being rigidly fastened to the shaft, which is arranged with a pivot at each end to turn within suitable bearings in the standards E, which latter are attached to the sides of the machine.

This method of hanging the rubber to the shaft enables it to adjust itself to all thicknesses of clothes, the rubber being operated back and forth over them as ordinarily, and it may be raised or lowered perpendicularly, as occasion may require, in the placing of the clothes on the rollers or board to be washed.

The rubber is divided in two parts, h' h, and is arranged to open and close for inserting and retaining the fabric, and is intended to be used when certain parts require to be specially operated upon without operating upon other parts.

The movable part of the rubber h is arranged with tongued ends, to slide in grooves made in the arms F, to which the immovable part h' is rigidly fastened, having a back plate, k, secured to the ends of the arms for strengthening the rubber in its connection therewith.

These arms have a handle, H, secured to the opposite ends, by which the rubber is operated.

The upper part of the rubber h' has a cleat, m, attached thereon at each end next to the arms F, and the latter have an arm, n, attached by pivot-screws o to the sides of them above the rubber, the opposite ends of these arms n and the ends of the cleats m below connecting with pivots arranged diagonally on the corner ends of the square bar J, so that by turning the latter either way the rubber h will be caused to open or close.

To operate the rubber h conveniently, and to secure it when closed, I use a slightly-tapering round lever, s, which is inserted through a hole in the bar J, over and on the top of the rubber, thus rendering the bar immovable, and consequently the rubber and the latter can only be moved or opened, supposing it to have been closed in the first place by withdrawing the lever from over the top of the rubber and raising it up, the depressing of the lever closing the rubber.

The rubber may be operated by a lever and ratchet, which will answer the purpose as well; and there may be other ways of doing it, but I prefer the method described as being the most desirable.

In the operation of the rubber the portion of the fabric selected to be rubbed is inserted between the two parts of the rubber, and retained tightly by closing the part h upon the same, and securing it by the lever in the manner described.

Having thus fully described my invention,

What I claim therein as new, and desire to secure by Letters Patent, is—

1. The rubber C, suspended by an arrangement of hinge-jointed arms, a b c, so as to permit the rubber to adjust itself to all thicknesses of clothes, substantially as set forth.

2. The rubber, consisting of two parts, h' h, arranged to open and close by the lever s for inserting and retaining the fabric, substantially as and for the purpose set forth.

As evidence that I claim the foregoing as my invention, I have hereunto set my hand and seal in the presence of two witnesses.

WILLIAM B. H. BEACH. [L. S.]

Witnesses:
JOHN JORDAN,
E. P. BABCOCK.